July 18, 1933. V. J. BURNELLI 1,918,688
AIRCRAFT
Original Filed March 27, 1928   4 Sheets-Sheet 2
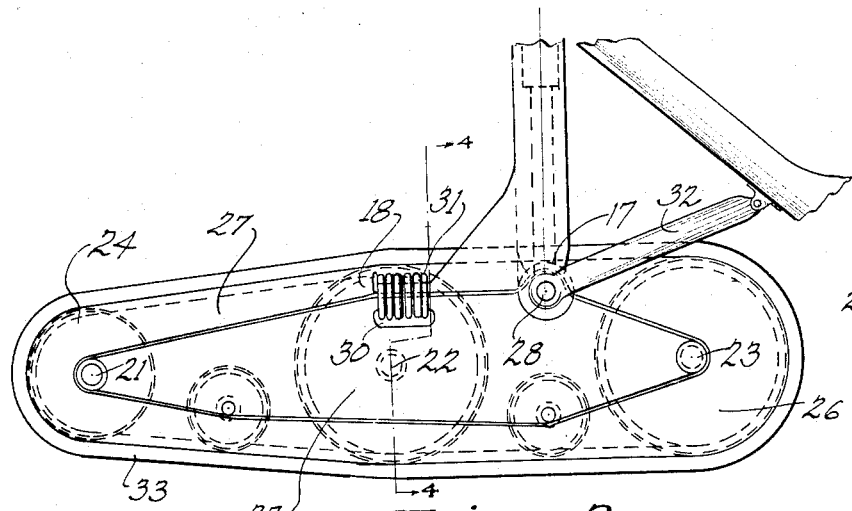
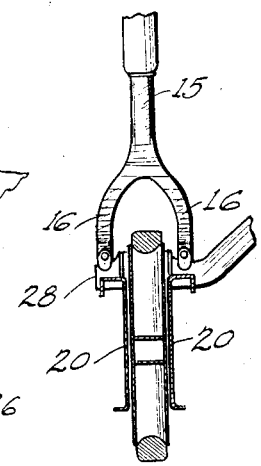
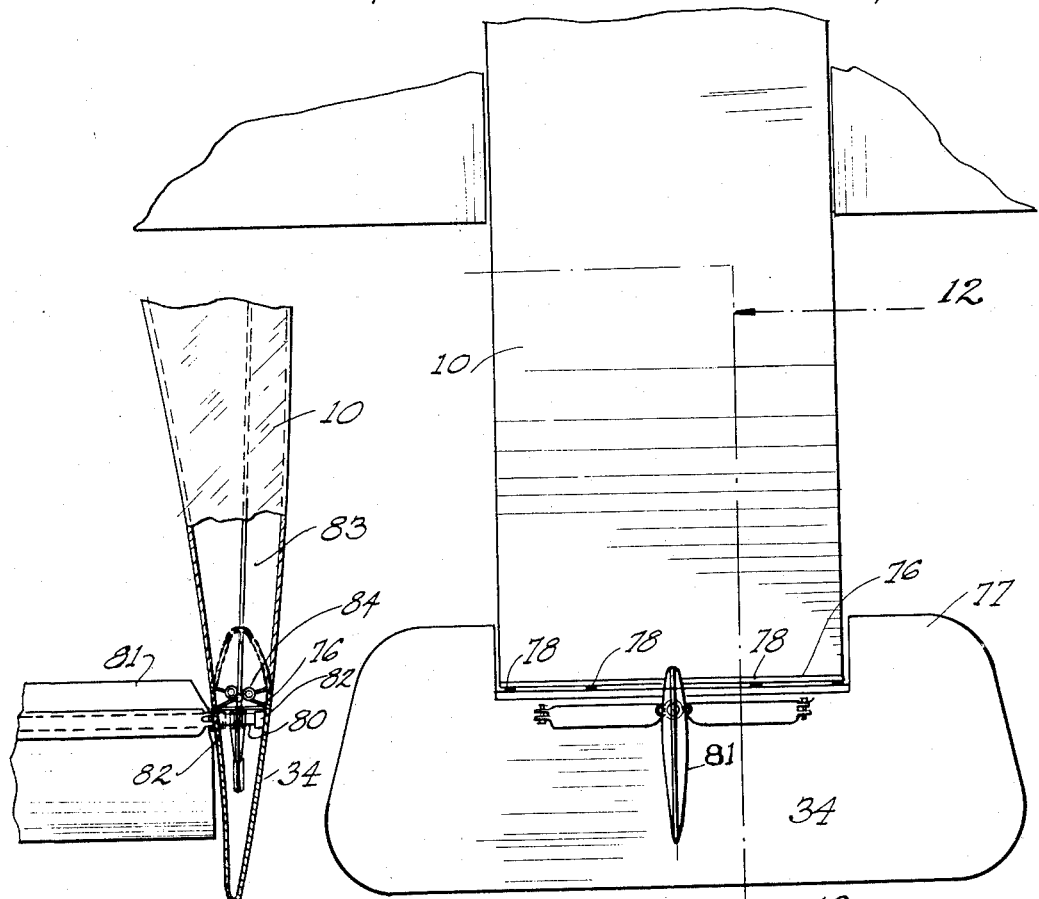
INVENTOR
VINCENT J. BURNELLI
BY
Frank H. Borden
ATTORNEY July 18, 1933.  V. J. BURNELLI  1,918,688
AIRCRAFT
Original Filed March 27, 1928   4 Sheets-Sheet 3
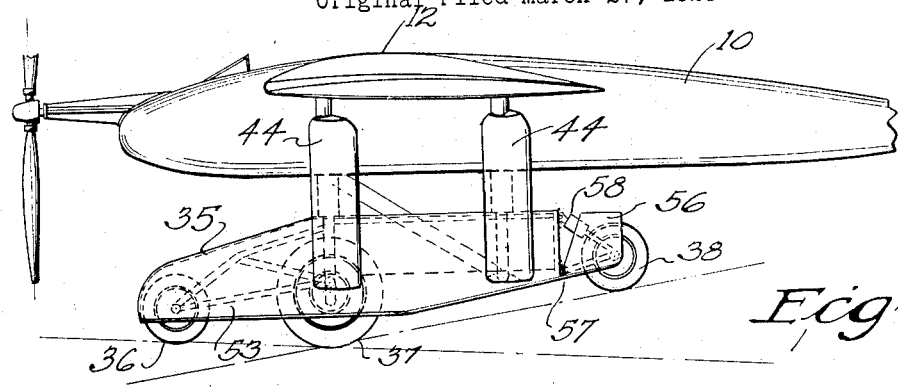
Fig~5
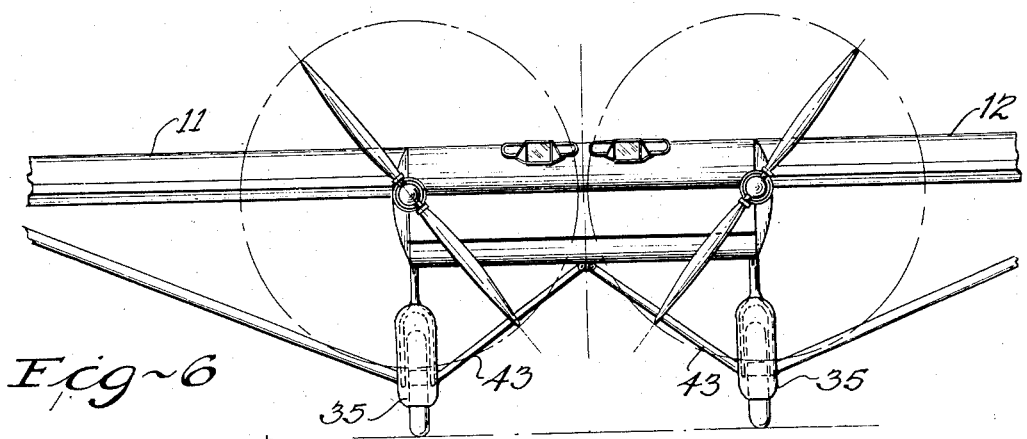
Fig~6
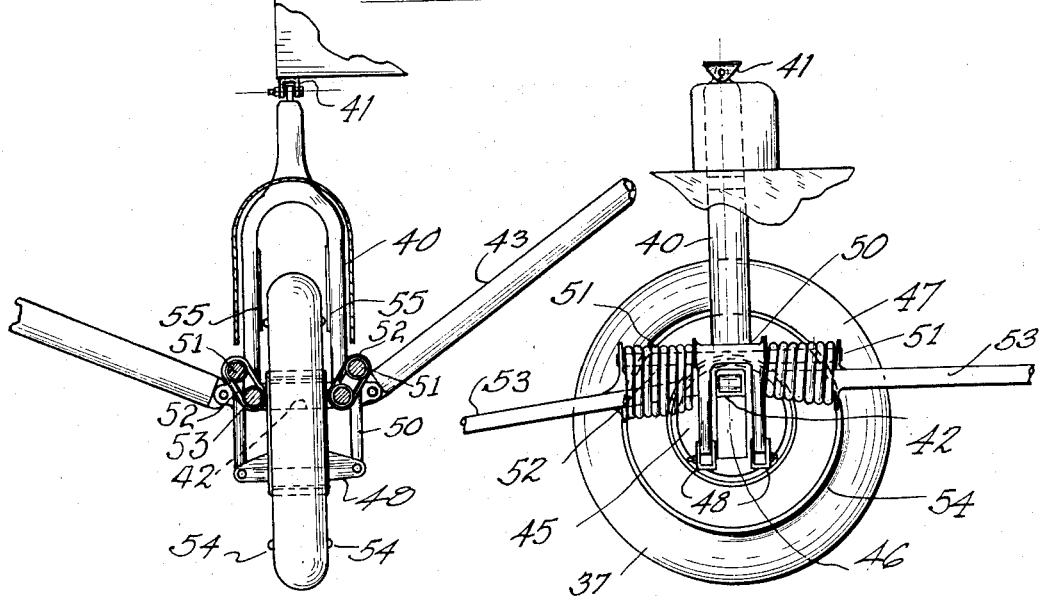
Fig~7   Fig~8
INVENTOR
VINCENT J. BURNELLI
BY
Frank H. Borden
ATTORNEY July 18, 1933.   V. J. BURNELLI   1,918,688
AIRCRAFT
Original Filed March 27, 1928    4 Sheets-Sheet 4
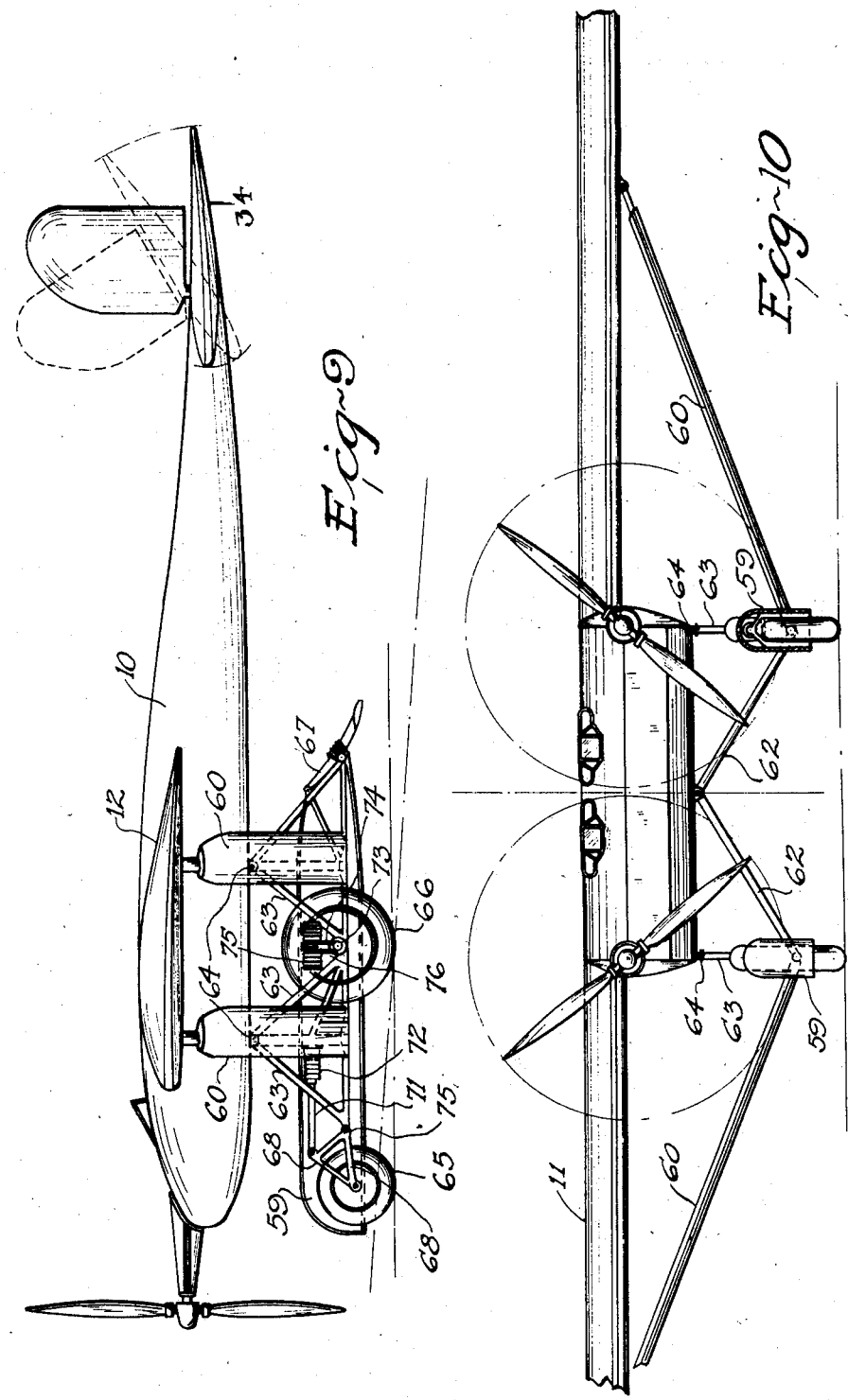
INVENTOR
VINCENT J. BURNELLI
BY
Frank H. Borden
ATTORNEY Patented July 18, 1933

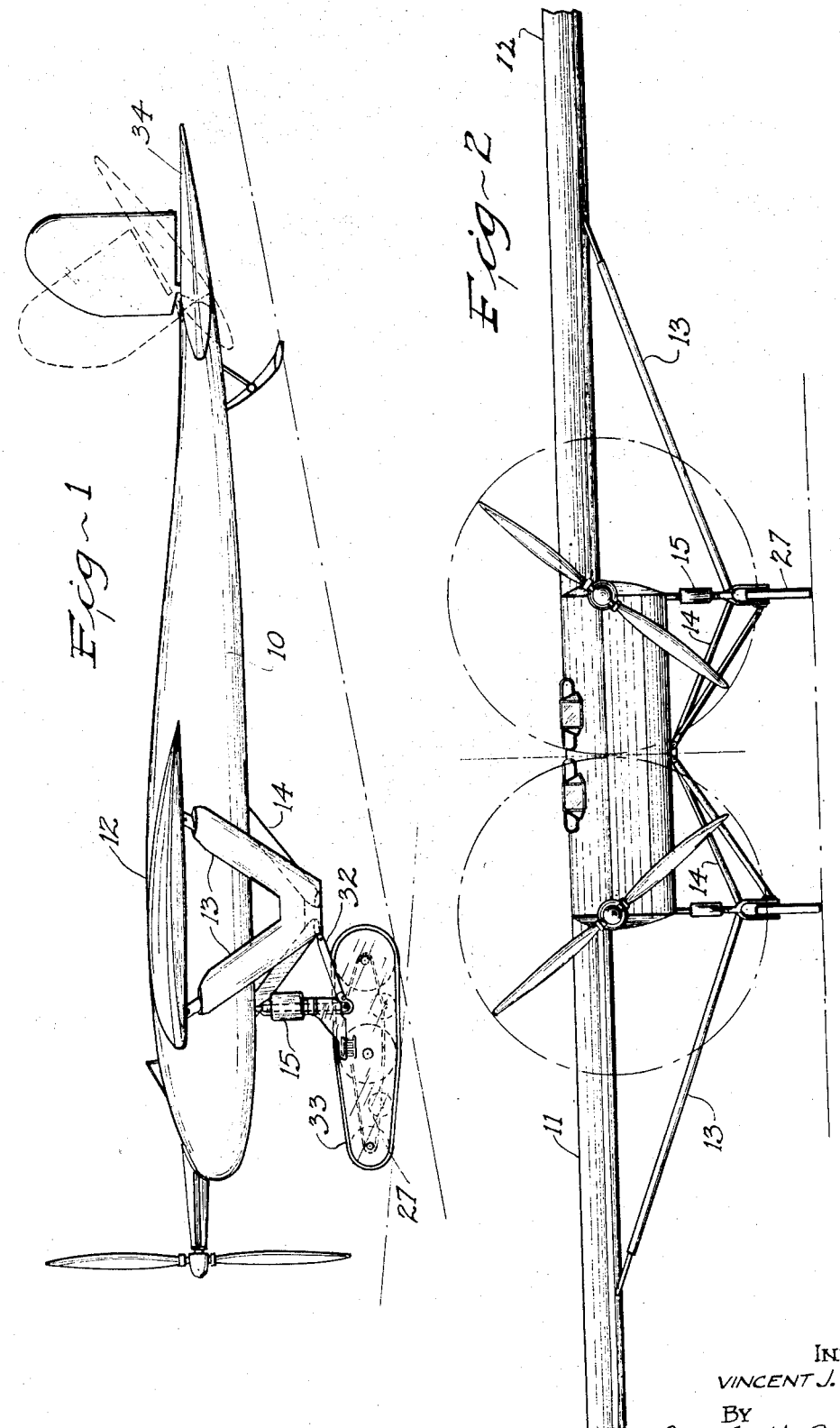

1,918,688

UNITED STATES PATENT OFFICE

VINCENT J. BURNELLI, OF NEW YORK, N. Y., ASSIGNOR, BY MESNE ASSIGNMENTS, TO BURNELLI AIRCRAFT, LTD., OF DOVER DELAWARE, A CORPORATION OF DELAWARE

AIRCRAFT

Application filed March 27, 1928, Serial No. 265,022. Renewed December 14, 1932.

This invention relates to aircraft.

Among the objects of the invention are; to provide means and mechanisms in an airplane cooperating to bring it to a quick and safe stop in its landing run; to utilize the upper exposed surfaces of an airplane as retarding elements; to improve landing gears of airplanes; to provide an airplane with a landing gear such that the airplane may assume a negative angle of lift relative the ground without nosing over; to provide a landing gear of less drag and resistance in flight compared with conventional landing gears; to provide means for relieving the inclination of the body and wings of an airplane when landing, from a plus or lifting angle to minus or depressing angles thus increasing the resistance of the whole to the airstream and increasing the traction of the ground contact elements; to improve the empenages of airplanes; to provide an airplane with an elevator as the termination of a fuselage of true airfoil contour; to provide an airplane with a landing gear a ground contact element of which is substantialy aligned with the center of gravity so that the airplane may be swung on a horizontal axis to expose the upper surfaces of the body and wings to the airstream by manipulations of the elevating surface; to improve and economize in the construction of airplanes; to provide an airplane with a body supported by a landing gear without the necessity for a tail skid toward the rear of the body thus enabling the use of lighter structural members in the body; and many other objects and advantages as will become more apparent as the description proceeds.

In the accompanying drawings,

Fig. 1 represents a side elevation of an airplane including one form which the invention may assume, Fig. 2 represents a front elevation of the same, Fig. 3 represents a detail elevation on a larger scale, illustrating the landing gear disclosed in Fig. 1, Fig. 4 represents a transverse vertical section therethrough, Fig. 5 represents a fragmentary elevation of an airplane according to the invention with a modified form of landing gear, Fig. 6 represents a fragmentary front elevation of the same, Fig. 7 represents a fragmentary enlarged section through the modified form of landing gear shown in Fig. 5, Fig. 8 represents a section therethrough, Fig. 9 represents a side elevation of an airplane according to the invention with a still further modified form of landing gear, having incorporated therewith a skid, Fig. 10 represents a fragmentary front elevation thereof, Fig. 11 represents a plan of a fragmentary portion of the fuselage disclosing the assembly of the empenage, and Fig. 12 represents a vertical section therethrough.

In using brakes and similar devices for bringing airplanes to a safe but quick stop in the landing run, it is highly desirable that such traction be provided as to render the brakes efficacious for the purpose, and that "nosing over", incident to application of the brakes, be obviated. This is one of the features of this invention, and is susceptible to many forms, of which a few of the most apt, and preferred, have been illustrated.

Referring now to the drawings, in Figs. 1, 2, 3 and 4, a form of endless track or "caterpillar" landing gear has been disclosed, cooperating with the improved tail surface assembly to be later described. The fuselage 10, which may be of any desired form and width, is preferably of the "Burnelli" type, having an airfoil contour, from which air foils 11 and 12 extend to form the main supporting wings of the airplane. Each airfoil or wing is supported by wing struts 13, joined in rigid assembly with fuselage struts 14, forming the main supports and trussing for the wings. Forward of the wing truss, and mounted independently thereof on each side there is a compression strut 15, vertically elastic by the use of strut contained shock absorbers, as will be clear, which carries the main load of the airplane, and taking it from the wing truss to which earlier forms of landing gears confined it. The strut 15 is bifurcated and has legs 16, having each a heel 17, and a forwardly extending toe 18. Side frame members 20 are provided having transverse axles 21, 22 and 23, upon which the respective rollers 24, 25 and 26 are journaled, and forming a longitudinally extending truck 27, pivoted by a pin 28 to the heel 17 of the compression strut. Each frame member 20, has a lug or ear 30 abutting the toe of the compression strut and forming a stop to limit the motion of the truck on its pivot 28 in one direction. A shock absorber element 31 joins the toe 18 and lug 30 to resist separation of the two by oscillation of the truck on its pivot in the other direction. A radius rod 32 pivotally mounted on truck axis 28, extends rearwardly to pivotal connection with the wing and fuselage struts, so that percussion of the impact of the landing gear with the ground is absorbed by the wing strut assembly, although the main load is carried by the compression strut. The truck 27 may be used with wheels and shock absorbing tires if desired, but it is preferred to use an endless track 33 carried in grooves in the rollers. It will be observed that the landing gear disclosed is substantially streamlined, and, due to the angle of the toe of the compression strut and the shock absorber element holding the truck up against the toe, the front of the truck is slightly elevated so as to minimize the resistance in flight. It is to be observed that the front roller or wheel is preferably of smaller diameter than the other rollers, and forms a bearing surface in line with the other bearing surfaces, although normally maintained in such position as to be out of contact with the ground. Conversely the rear roller is normally depressed and forms the initial contact with the ground in landing and is the last bearing surface in contact with the ground in taking off. In operation in flight the parallel spaced trucks forming the landing gear are held in their minimum resistance position by the shock absorber element until the airplane descends for a landing. The initial contact with the ground is established with the rearmost bearing surface, the endless track in contact with wheel 26, which swings the truck on its axis 28 against the resilience of the shock absorbing element so that a line contact of the bearing surfaces and the ground is established. With the contact thus made, the operator or pilot may then swing the elevating surface 34 to a negative angle, elevating the rear end of the fuselage, by a turning movement of the entire airplane on the axis 28 of each truck, so that the nose points downwardly, overturning or nosing over being prevented by the abutment of the toe 17 of the compression strut with the adjacent ear 30, transmitting the impulse or force to the front bearing surface 24, which being disposed well in advance of the center of gravity prevents an upset. The angle thus assumed by the airplane is a negative one, in which the upper surfaces of the fuselage and wings are exposed to the airstream thus forcing the entire airplane downwardly upon the landing gear, increasing the traction thereof relative the ground, and rendering the brakes, disposed in any suitable manner for operation relative the endless track or any desired wheel or bearing element of the truck, immediately effective. This is also accompanied by a rearward drift or drag as a resultant of the inclination of the body and wings relative the airstream, assisting in retarding the flight of the airplane relative the air while the landing gear is retarding it relative the ground. It is pointed out that with the trucks independently pivoted on each side of the composite landing gear, landings may be effected in rougher ground than has heretofore been possible, each truck, with its aligned plurality of bearing points being capable of riding over imperfections in the landing surface without appreciable effect on the lateral stability of the airplane. With the endless track disclosed, with the front bearing element raised a trifle from the plane of the aligned bearing surfaces or elements, it is easy for each track to be guided up to ride over bumps and depressions, without tending to dig into the ground. It being noted that the main load of the airplane is carried to the landing gear by substantially vertical compression struts, independent of the wing struts so far as the load is concerned, but that the rearward shock incident to landing is absorbed by the wing strut assembly.

In the form of invention disclosed in Figs. 5 to 9 inclusive, a similar fuselage 10 has laterally extending airfoils 11 and 12 respectively, as in the form of invention already described. In this case, however, the landing gear preferably comprises a rigid housing 35 on each side of the fuselage, each containing a rigid front wheel or roller 36, an intermediate main bearing resilient wheel 37, and a rearwardly extending castered wheel 38. In each housing the several wheels 36, 37 and 38, are normally in alignment. The housings each include yokes 40 extended vertically to connection with the fuselage, as at 41, the lower ends or legs of the yokes being joined by a rigid follow through member or transverse link or tie 42, each link 42 being connected at one side to fuselage struts 43, and on the other to wing struts 44. This construction effects a strong and rigid strut assembly for the wings, and effectually reinforces the trucks of the landing gear. The intermediate wheel 37 is highly resilient without disturbing the transverse link 42 about which it rotates, through the novel wheel assembly disclosed, in that a vertically slotted drum 45 is provided in the slot 46 of which the transverse tie or link 42 is mounted so that the drum may slide vertically relative the link. Relative rotation of the drum and link is precluded by forming the link with angles as shown. The outer periphery of the drum 45 comprises a raceway in which bearings are disposed and upon which the rotatable portion 47 of the wheel is mounted. The drum is provided on its opposite faces at the lower portions thereof, with perpendicular, (substantially) ears 48, to which the yoke 50, straddling the link 42, is pivoted, there being a yoke on each side of the wheel, each yoke having fore and aft extensions 51, and being connected by shock absorber elements 52 to structural elements 53 extending through the housing 35. It will be understood that vertical shocks incident to landing will tend to drive the entire wheel 37 upwardly, which is permitted under the restraining influence of the shock absorbers by vertical movement of the drum relative the rigid transverse link 42, through the slot 46 in the drum. The upward movement of the drum transmitting movement through ears 48, to yoke 50, extending the shocks absorber elements 52 against the stationary and rigid structural member 53. It will be observed that the wheel thus formed is highly flexible both vertically, and axially, owing to the non-fixed axis of rotation. To prevent axial movement, as under the influence of a side swipe or transverse landing, to prevent buckling of the wheel, it is preferred to form a peripheral guide on each side of wheel 37, preferably just inside of the tire, as at 54, in position to engage hardened guides 55 within the housing, preferably mounted on the legs of the yoke 40, and which may take the form of rollers. This prevents side torsion on the wheel. Preferably there is a little clearance between the guides on the wheel and yoke to preclude undesired interference, but not enough to prevent immediate contact under side torsion. It is to be noted further that the vertical yoke 40 is so designed in strength transversely as to withstand the load usually taken by the axle. The assembly of the housing, transverse links, wing and fuselage struts is more compact, and has less resistance than the former landing gearing arrangements, and, of great importance, effects a rigid attachment for a strut to support the wings in line with the front spar of the wings.

The rear wheel 38 is provided to support the airplane on the ground, as the center of gravity preferably is behind or in rear of the intermediate or main wheel 37, taking the place of a tail skid, and obviating the reinforcement of the fuselage rear heretofore necessary with such tail skids.

Wheel 38 is mounted in a separate housing and frame work 56, pivoted at 57 to the rear end of housing 35 at the lower edge thereof by unyielding structural elements, and connected at the upper end of the housing 35 by a pivoted shock absorbing strut 58, the pivots at top and bottom being in substantially vertical alignment so that the wheel 38 may caster relative the main body of the housing 35, but being yieldable vertically by the shock absorber mounting. It will be clear that the sheathing covering the frame work, and comprising with the structural elements the housing 35 effectively streamlines the truck assembly so that there is a minimum resistance to the passage thereof through the air.

The disclosure in Figs. 9 and 10 is illustrative of still another form of landing gear dispensing with the conventional tail skid, and providing means whereby the entire airplane may be disposed at a negative angle in running over the ground to facilitate the quick stopping of the landing run, as the several different forms of landing gear disclosed are all so designed to do. In this form of invention the fuselage 10, wings 11 and 12, are the same as in the other forms, and each truck of the landing gear is in the form of a rigid housing through which the stresses of the wings and fuselage are carried. Preferably in line with the spars of the wings, wing struts 60 carry down to the framework 61 of the respective trucks or housing 59, being joined by the frame work to fuselage struts 62, which may comprise single struts or triangulated struts as desired. Each truck or housing 59 is connected by vertical elements 63 to the adjacent portions of the fuselage as at points 64. Each truck or housing contains two aligned wheels 65 and 66, and a tail skid 67.

The front wheel 65 is mounted in a frame 68, pivoted at 70 to the housing framework, and pivoted at the top to a link 71 engaging a shock absorber 72, so as to be vertically yieldable upon impact with the ground. The rear wheel 66 is mounted on an axle 73 mounted in slots 74 in the framework and vertically movable therein against the elastic resistance of a shock absorber 75, anchored at its longitudinal extremities to the framework, and connected to the axle 73 by arms 76 engaging the shock absorber at substantially the center, as will be clear. The skid 67 is connected to the rear end of the truck in any desired manner so as to effect a resilient reinforced support for the airplane, with the wheel 66, and it is preferred that the struts, wheels, and tail skid of each truck be in longitudinal alignment. It will be understood that the trucks disposed on each side of the fuselage are substantially identical.

Regardless of the form assumed by the landing gear of the invention, it is contemplated that in each case one at least of the contact elements will be provided with brakes of some description, of which there are many in the art, under the control of the pilot or operator, such that variable resistance is imparted to the landing gear capable of causing a quick stop in the landing run. Even without such brakes, however, it is pointed out that the inclination of the body and wings to a negative angle relative the airstream or line of flight, effects an appreciable retarding effect upon the movement of the airplane through drag on the air. This factor is amplified by the depressing action the negative angle effects as a resultant of relative movement of the airplane and the air, forcing the weight of the airplane down upon the landing gear and increasing the frictional contact, and frictional resistance, thereof.

In order to effect the negative inclination of the body and wings during landing, it is desirable that an elevator control surface of appreciable area be provided, and the control surfaces disclosed herein are quite effective for the purpose, without any appreciable effect upon the lift of the airplane, nor adverse factor in maneuverability.

As shown in Figs. 1, 9, 11 and 12, the fuselage 10 which is preferably, though not essentially, of true airfoil contour, terminates at the rear end in a thin trailing edge, 76 although of appreciable lateral width preferably, to which a fan tail elevator 34, having counterbalanced edges 77, is pivoted, as at 78. The elevator 34 is a true trailing edge section merging with the upper and lower surfaces of the fuselage to form a complete streamlined whole, with the fuselage. In side elevation it forms with the fuselage the rear end of an airfoil contour.

A novel and advantageous feature of the empenage, is the provision of a rudder post 80 carrying the rudder 81, mounted in bearings 82 in the elevator so that the rudder post is rotatable in the elevator and is swung through a vertical plane with the elevator. Control wires 83 pass through the fuselage and over a pair of rollers 84 disposed substantially at the axis of oscillation of the elevator so that the pull on the rudder post is constant regardless of the position of the elevator.

Obviously there are many further modifications that may be incorporated with the invention without departing from the novel features thereof as recited in the following claims, and which are to be construed as within the limits of the invention.

I claim as my invention:

1. In an airplane, ground contact means arranged to sustain the airplane in stable equilibrium on the ground at an angle relative the line of flight such that the lift of the airplane is substantially nullified.

2. In an airplane, a landing gear formed of a pair of spaced trucks, each truck comprised of a plurality of bearing surfaces in alignment longitudinally of the airplane, and so arranged as to sustain the airplane in stable equilibrium in movement on the ground with its upper surfaces at a negative angle relative the airstream effecting a downward thrust on the landing gear to increase the traction thereof.

3. In an airplane, a landing gear formed of a plurality of substantially streamlined housings, each containing a plurality of wheels in longitudinal alignment susceptible to sustaining the airplane in stable equilibrium in movement on the ground with its upper surfaces at a negative angle relative the air stream, with a resultant increase in the traction of the landing gear, and brake means associated with the landing gear.

4. In an airplane a fuselage having wings, struts bracing the wings and forming a truss with the fuselage, a compression strut connected to the fuselage in advance of the wing struts, a landing gear truck pivotally mounted on the compression strut and having a plurality of contact bearing surfaces, a radius rod pivoted between the truck and the wing struts to transmit percussion shocks of landing to the wing struts.

5. In an airplane, a fuselage, airfoils projecting laterally on opposite sides of the fuselage, a wing strut engaging an airfoil and rigidly engaged with a transverse link, a fuselage strut engaged between the transverse link and the fuselage rigidly trussing the airfoil, a landing gear including a housing, a resilient wheel disposed in the housing and rotatably disposed about said transverse link, a supplemental wheel longitudinally aligned with the first mentioned wheel in the housing.

6. In an airplane, a fuselage and wings, means for supporting the fuselage at the forward end only, said means comprising a streamlined casing, a pair of longitudinally aligned wheels disposed in the casing, and a supplemental pivoted ground contact means at the rear of the casing normally in longitudinal alignment with said wheels.

7. In an airplane, means for supporting the airplane at the forward end only, comprising a wheeled landing gear formed of a pair of laterally spaced longitudinally extending streamlined housings, each housing supporting a pair of longitudinally spaced aligned wheels, and a rearwardly positioned pivoted skid mounted on each housing in normal alignment with the wheels, said wheeled landing gear forming the sole support of said airplane on the ground.

8. In an airplane, a landing gear comprising longitudinally aligned wheels so disposed that the center of gravity lies normally between the extremities of the aligned wheels, the landing gear provided with yielding means permitting the airplane to assume a negative angle relative the airstream such as to nullify the lift of the airplane, without moving the center of gravity beyond the extremities of the wheels so as to maintain the airplane in stable equilibrium.

9. In an airplane, a landing gear so arranged as to have plural contact line engagement with the ground while the airplane assumes a negative angle relative the airstream such as to nullify the lift thereof but with the airplane maintained in stable equilibrium, to increase the traction of the landing gear for retarding the movement of the airplane.

10. In an airplane, a landing gear therefor comprising a plurality of longitudinally aligned contact bearing surfaces, means permitting the line of contact being angularly varied relative to the longitudinal axis of the airplane according to pressures imposed on the bearing surfaces so that the airplane may have moving stable support at positive lifting angles, and also at negative lift nullifying angles.

11. In aircraft, an airfoil, a supporting gear, the supporting gear arranged to establish a line contact and to stably support the aircraft including the airfoil, the line of contact being angularly divergent from the chord of the airfoil toward the rear of the aircraft whereby the stable supporting of the aircraft is at such an angle as to substantially nullify the lift of the airfoil.

12. In aircraft, an airfoil, a supporting gear arranged to establish a line contact and to stably support the aircraft including the airfoil during such contact, the line contact and the chord of said airfoil being non-intersecting if prolonged in the rear of the aircraft, whereby during such stable support of the aircraft the lift of said airfoil is substantially nullified.

VINCENT J. BURNELLI.